Figure 1:
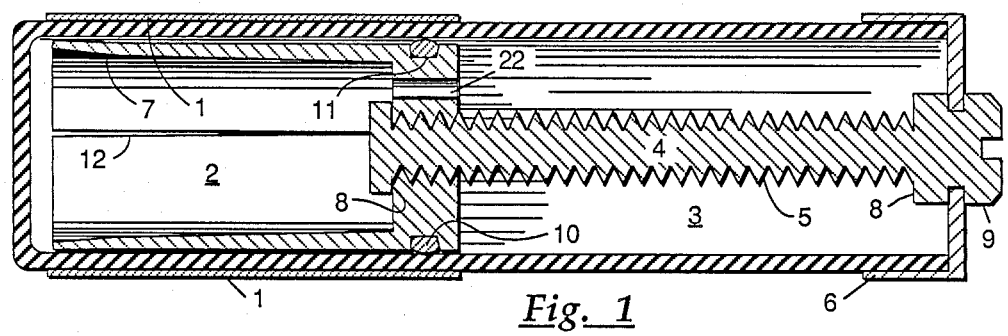

United States Patent [19]

Funk

[11] Patent Number: 4,851,961

[45] Date of Patent: Jul. 25, 1989

[54] ENDLESS REACTOR

[76] Inventor: Alexander L. Funk, 648 W. Club Blvd., Durham, N.C. 27701

[21] Appl. No.: 270,773

[22] Filed: Nov. 14, 1988

[51] Int. Cl.⁴ .............................................. H01G 5/12
[52] U.S. Cl. .................................................. 361/295
[58] Field of Search ................................. 361/294, 295

[56] References Cited

U.S. PATENT DOCUMENTS

| | | | |
|---|---|---|---|
| 2,591,644 | 4/1952 | Wadsworth | 361/295 |
| 2,747,147 | 5/1956 | Shull | 361/295 |
| 3,071,716 | 1/1963 | Young | 361/294 |
| 3,361,945 | 1/1968 | Mittler et al. | 361/295 |
| 3,426,256 | 2/1969 | Vinz | 361/295 X |
| 3,584,271 | 6/1971 | Blickstein et al. | 361/294 |
| 4,764,843 | 8/1988 | Mittler | 361/294 |

FOREIGN PATENT DOCUMENTS 1145170  3/1969  United Kingdom ................ 361/295

Primary Examiner—Donald A. Griffin

[57] ABSTRACT

A component of variable capacitive reactance of the non-rotating piston trimmer type a support bushing of which confines an adjustment screw to endless rotation but zero displacement, by which all damage to the mechanism is avoided by either breakage or wallowing. This screw possesses both threaded means to engage a piston which resists, but does not prevent, rotational and axial motion by engaging the inner wall of a tubular dielectric with a clutch and stopping means to limit both directions of travel of said piston within the dielectric, said stops of which, cojoined by force imparted by the clutch, translate the piston's travel from axial to rotational when they are engaged.

3 Claims, 2 Drawing Sheets

ENDLESS REACTOR

FIELD OF THE INVENTION

This invention relates to an electronic component whereof a piston secured to a lead screw varies the capacitive reactance of the device, widely known to the art as a piston trimmer capacitor and, more particularly, imporovements to provide for robustness, high power operation, and adjustment by computers.

BACKGROUND OF THE INVENTION

The needs to which piston trimmer capacitors are applied have changed substantially. Before the advent of microelectronics these devices were mainly signal, rather than power, elements relied upon for timing. Needed attributes included small size, high precision, and monotonicity. They were infrequently adjusted, so to maintain stability with time their adjusting means were necessarily of stiff action and not of robust construction. Indeed, fragility is so characteristic of the art that a leading providor, the assignee of U.S. Pat. No. 3,584,271, advises electrical connection be made with silver-bearing resin rather than with solder. Those designers intrepid enough to place devices characterized by prior art within a servo- or computer negative feedback loop or other widely varying application have seen them fail rapidly through wear or breakage. Voltage ratings greater than a few hundred are generally not required for signal devices, nor is a great range of adjustment.

Crystals, phase locked loops and digital dividing chains have invaded much of the trimmer capacitor's field of use in small-signal areas, leaving to them power applications such as antenna matching and the like. In these restricted areas of application important parameters shared with signal devices are high quality factor, and monotonicity. Other factors, equally important, not shared with signal devices, are resistance to voltage breakdown, range of adjustment, frequency agility and computer compatibility. High voltage withstanding properties are inherently necessary in power devices. Wide range of adjustment is inherently desirable in an impedance matching device to increase the range of conditions to which it is applied, and frequency agility and the attendant need to adjust the device rapidly and repeatedly is coming forward in the disciplines of radar and nuclear magnetic resonance. Most instrumentation is now based on computer control, so sensitivity to this need dictates trimmer design. Prior art has produced trimming condensers which are designed to be adjusted by the human hand. Computers are capable of making adjustments much more rapidly, so it is reasonable to include in the present specification means to permit a condenser to be very rapidly adjusted without failure.

SUMMARY OF THE INVENTION

It is the object of the present invention to provide a variable electronic component which is more rugged both in its construction and in its manner of utilization, which can be adjusted over a greater range, can withstand higher levels of power, and can be more easily interfaced to machine intelligence than those of prior art.

It is a further object to provide these improvements while maintaining structural simplicity with its attendant economy of manufacture.

A still further object of the invention is to provide these benefits without substantially abrogating the general attributes of a piston trimmer capacitor so well laid out in the objects presented by the inventors named in U.S. Pat. No. 3,361,945.

DESCRIPTION OF THE INVENTION

In accordance with the simplest embodiment of the present invention and common to all further embodiments herein listed, two electrodes in FIG. 1, one a stator [1] to which electrical connection may be made, fashioned generally as a hollow conductive cylinder fixedly mounted externally at one end of a dielectric tube [3], and the other a rotor [2], moveable axially therewithin. The tube is closed at the end opposite the stator by a support bushing [6] fixed rigidly to it, to which electrical connection may be made. In the following discussion all motion is taken to be both relative to this support bushing and along or about a singular axis, about which all parts are roughly radially symmetrical.

The rotor is provided with a springy clutch [10], which frictionally engages the interior tube wall and resists, but does not prevent, both axial and rotary motion. The rotor contacts the inner wall of the tube conformally because it is comprised of a springy sheet of conductive material [7] which in the preferred embodiment comprises the clutch integrally. A lead screw [4] centrally penetrates the bushing and is prevented thereby of all but rotary motion, and presents to the exterior of the device an adjustment surface [9]. The rotor is likewise traversed, but engages with its own internal threads [FIG. 4:20] the external threads [5] of the screw. As the screw is rotated, it overcomes the drag of the clutch and the rotor travels axially but not radially along it within the tube, being brought nearer or farther from the stator. At both ends of the rotor to stator travel are stops [8] integral to the screw which in being pressed upon by the rotor prevent further axial travel of same, causing it to be limited to only rotational travel with further rotation of the screw, which, save the resistance of the clutch, is thus permitted to continue to turn endlessly. At these stops the capacitive reactance of the device essentially no longer changes with further rotation of the screw. It is by this mechanism the device is rendered robust in that no degree of rotational force by an applied tool upon the screw can damage it, either by breakage or by wallowing, and it is in reference to this means the term "endless" is applied in the title of this application. Furthermore, it is by this means that computer-controlled adjustment of the device as by a stepper motor or the like is enhanced since no sensor is required to communicate to the computer that the device has reached a stop, since the computer simply need overdrive the device in either direction and then count back to reach a given repeatable position. Additionally, it is through this limiting of force upon the screw that the degree of attachment of the bushing [6] to the tube can be minimized, hence increasing the effective distance between bushing and stator, with an attendant increase in working voltage. An airway [22] is provided in the rotor to dissipate the accumulation of air pressure during extremely rapid adjustment.

Figure 2:
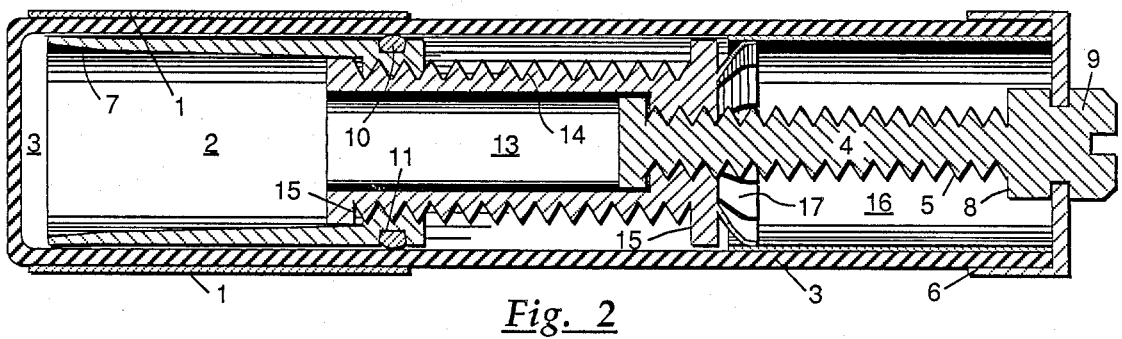
Figure 3:
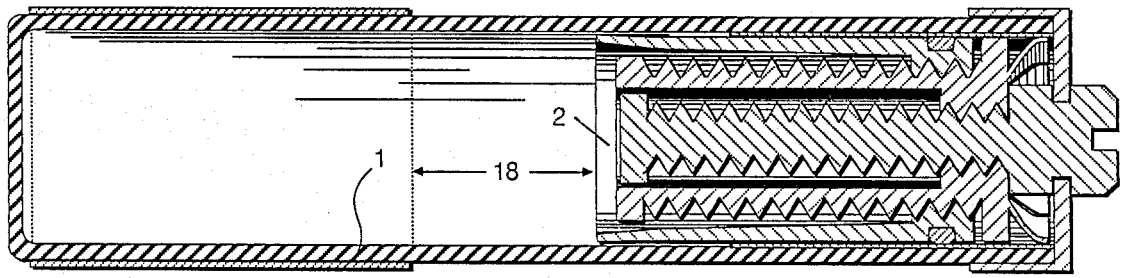

In the embodiment upon which the claims are based shown in FIG. 2, the screw is supplemented by an additional screw [13] with an internal thread engaging the screw, and an external thread engaging the internal thread of the rotor, interposed between the screw and the rotor, also provided with stops [15], such that when the three are telescoped, their minimum combined length is substantially less than that of screw and rotor alone as may be determined by comparing FIG. 3 with FIG. 1. By this increased separation [18] the capactiive coupling of the rotor with the stator is reduced over prior art, which in turn increases the ratio of minimum to maximum possible reactance within the device.

In a further embodiment, the tube is provided with an internal conductive cylinderical sheath [16] at the end occupied by, and in electrical contact with, the bushing, which does not continue toward the stator to such extent that it appreciably capacitively couples therewith. A conductive spring skirt [17] fixed to the additional screw, conformally in slidable contact with the sheath, provides electrical connection from the bushing to the rotor which is an augmentation over that provided by the screw alone.

Figure 4:
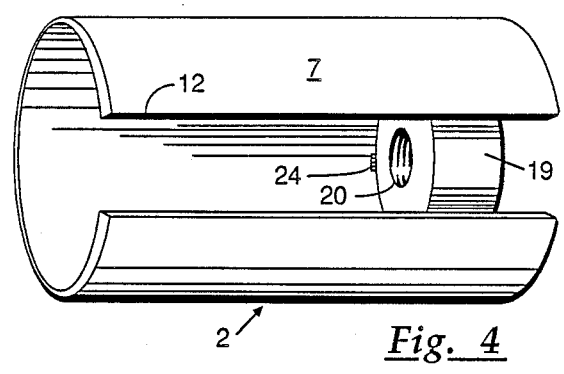

The remaining embodiments treat the construction of the rotor. FIG. 4 shows the preferred embodiment, mentioned above, wherein the rotor and the clutch are the same, comprised of a torus [19] provided with an internal thread [20] upon which a springy conductive sheet [7] is so mounted by an attatchment area [24] opposite a lateral gap [12] as to conformally ring the inner surface of the tube to provide an outward force. The lateral gap shown in the open relaxed position, closes to a vanishingly small slit when the rotor is in place within the tube. The flexibility of the rotor further enhances the ruggedness of the device over the improvements heretofore noted in that no amount of heat due to soldering or the like can burst the tube due to thermal expansion of the rotor.

Figure 5:
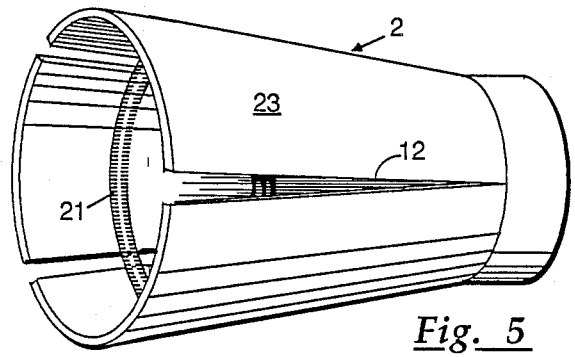

In the less preferred embodiment of FIG. 5, the flexible rotor sheet may be pressed outwardly against the tube by a springy separate member [21] within the rotor. The rotor sheet may have one or more overlapping or abutted longitudinal plates [23] for the purpose of modulating the force with which it engages the tube.

Figure 6:
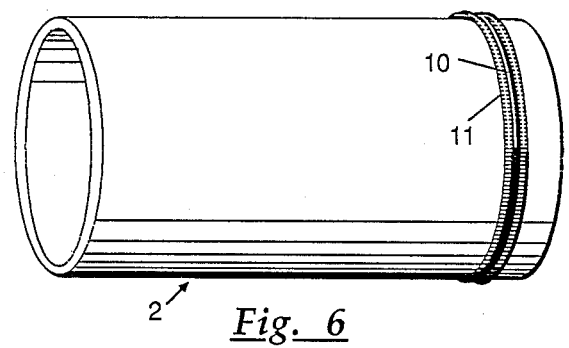

In another less preferred embodiment shown in FIG. 6, the rotor may be of rigid material, but circumscribed by a band of resilient material [10] held to the rotor within a channel [11] between it and the inner wall of the tube.

What is claimed as new is represented in three claims:

1. A component of variable capacitive reactance of the tubular non-rotating piston trimmer type comprising a stationary electrode surrounding one end of a dielectric tube, a support bushing abutting the other end of said dielectric; a piston comprising an electrode axially and rotationally moveable relative to said stationary electrode, a rotatable lead screw of compound construction of several similarly-acting members each provided with stops for limiting axis travel of the adjusting means such that the relationship between the piston and the positioning means has a telescoping action, fixed axially through said support bushing and presenting an adjustment means exterior thereto, extending with an engaged thread through said piston.

2. The invention in claim 1 in which that part of said dielectric abutting said support bushing is internally circumferentially coated with a conductive means electrically continuous with said bushing.

3. The invention in claim 2 in which sections of said compound lead screw assembly are each provided with springy conductive means interposed between it, and electrically contiguous to, said circumferential conductive coating.

* * * * *